SEMICONDUCTOR DELAY LINE

Filed July 30, 1965

INVENTOR.
KERN K.N. CHANG
BY
Edward J. Norton
ATTORNEY

United States Patent Office 3,466,575
Patented Sept. 9, 1969

3,466,575

SEMICONDUCTOR DELAY LINE

Kern K. N. Chang, Princeton, N.J., assignor to RCA Corporation, a corporation of Delaware Filed July 30, 1965, Ser. No. 475,984
Int. Cl. H03h 9/30; H03f 3/16
U.S. Cl. 333—29 2 Claims A distortionless delay line which by restoring losses in the line maintains the amplitude of the applied wave as it passes along the line, the delay line including a metal conductor in juxtaposition with, but insulated from, semiconductive material.

Figure 1:
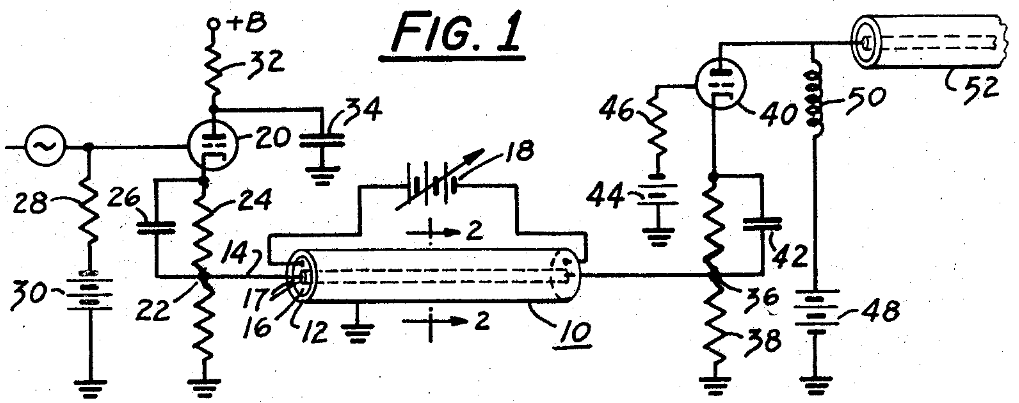

This invention relates to a delay line including semiconductive material. This delay line is suitable for, but not limited to, providing the delay required in color television receivers. For example, separating of chrominance information from the composite received signal as by a band-pass filter delays the chrominance information. Therefore after the luminance information and the chrominance information are separated, a delay line is provided to delay the luminance information so as to restore the required phase relationship between the luminance information and the chrominance information.

In known delay lines including semiconductive material, a voltage is applied along a rod of semiconductive material, such as n or p type germanium or silicon, and an input terminal and an output terminal are provided at spaced positions along the rod. A signal applied to the input terminal arrives at the output terminal after a delay which is proportional to the distance between the terminals and inversely proportional to the voltage impressed along the line. Controllable delays up to 100 microseconds are obtainable with such delay lines. However, in such a delay line, the carriers injected into the rod at one of the terminals, instead of going from one terminal directly to the other, start to diffuse as soon as they are injected into the rod whereby the amplitude of the signal to be delayed is attenuated. Furthermore, in this type of delay line, if two or more pulses of carriers are drifting along the rod at the same instant, each pulse effects the delay of the other, whereby the desired delay for the plurality of pulses may not be obtainable and may vary depending on the signals applied. Furthermore, the rise time in such a delay circuit is such that the phase and amplitude relationships between the several frequency components of the input wave is not preserved, whereby the delay line may distort the wave that it delays.

It is an object of this invention to provide an improved delay line.

It is another object of this invention to provide a delay line having substantially no losses.

It is a further object of this invention to provide a delay line in which the phase and amplitude relationship of the various components of the delayed wave is not varied to any substantial extent by the line.

According to one embodiment of this invention, a concentric conductor is provided and the space between the inner and the outer conductor of the concentric conductor is filled with semiconductive material, the semiconductive material being insulated from the inner and outer conductors. A delay controlling voltage, which may be variable, is applied between ohmic contacts on the respective ends of the semiconductive material. The signal to be delayed is applied to one end of the inner concentric conductor and the delayed signal is taken from the other end thereof. According to another embodiment of this invention, a rod of semiconductive material is placed on or in juxtaposition to a first conductor which may be flat, the rod of semiconductive material being insulated from the first conductor. Another conductor which also may be flattened is placed on or in juxtaposition to the semiconductive rod, this other conductor being insulated from the semiconductive rod and also from the first conductor. A voltage may be impressed across ohmic contacts provided at the ends of the semiconductive rod. The signal to be delayed is connected to one end of one of the conductors and the delayed signal is taken from the other end thereof. In both of these embodiments of the invention, the conductor to which the signal is not applied may be grounded. In a third embodiment, a wave guide is filled with semiconductive material and the delay controlling voltage is applied across the ends of the material. The signal to be delayed may be coupled to the wave guide near one end thereof and the delayed signal may be taken from a coupling means near the other end of the line. In this embodiment, the conductor comprising the wave guide may be grounded.

Figure 2:
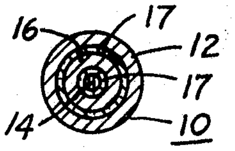
Figure 3:
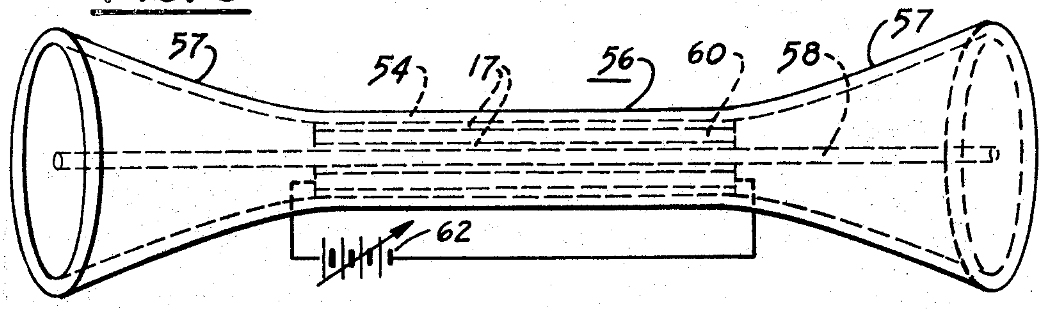
Figure 4:
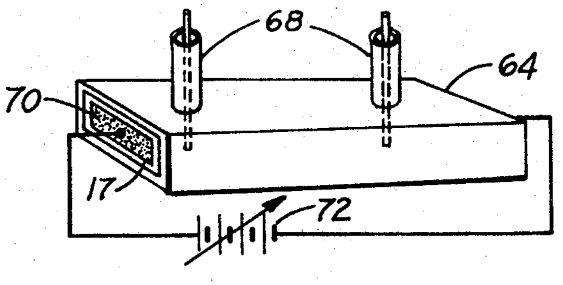
Figure 5:
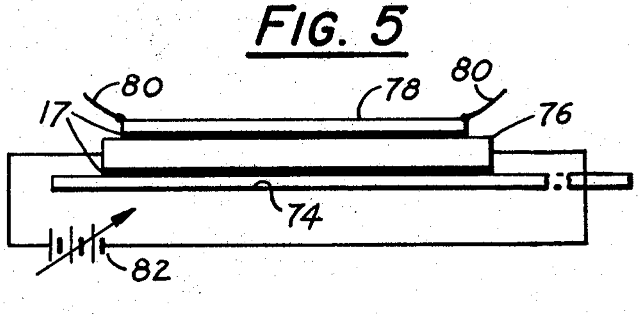

The novel features of this invention, both as to its organization and method of operation as well as additional objects and advantages thereof will be understood more readily from the following description when read in conjunction with the accompanying drawing in which:

FIGURE 1 shows one embodiment of a delay line of this invention in combination with an impedance matching circuit therefor, FIGURE 2 is a cross section of the delay line of FIGURE 1 on line 2—2 thereof, and at an enlarged scale, FIGURE 3 shows a delay line such as that of FIGURE 1, the ends of the delay line of FIGURE 3 being modified for impedance matching purposes, and FIGURES 4 and 5 show other embodiments of the delay line of FIGURE 1.

Referring first to FIGURES 1 and 2, a concentric line 10 is provided. This concentric line 10 comprises an outer conductor 12 and an inner conductor 14. The space between the inner and outer conductors 12 and 14 is filled with a semiconductive material 16 such as gallium arsenide (GaAs) or indium antimonide (InSb) or n or p type germanium or silicon. The semiconductive material 16 is insulated from both the outer conductor 12 and the inner conductor 14 by a thin film insulator 17. A direct voltage source 18, which may be variable as indicated by the arrow, is connected across the exposed ends of the semiconductive material 16 by means of ohmic resistive contacts to the ends thereof. The polarity of the voltage source 18 has no effect on the delay of the delay line 10. The amount of the delay is inversely proportional to the voltage of the voltage source 18. The signal to be delayed is applied at one end, the left end as viewed in FIGURE 1, of the inner conductor 14, and the delayed signal is taken from the right end of the center conductor. If desired, the outer conductor 12 may be grounded as indicated.

The described delay line 10 has a very low impedance. To prevent reflection of the signal applied to the delay line or of the delayed signal applied to a load, impedance matching means such as that shown in FIGURE 1 can be provided. For example, the signal to be delayed is shown as being applied to the grid of a vacuum tube 20 connected as a cathode follower with the inner conductor 24 being connected to a point 22 on the cathode resistor 24 of the vacuum tube 20. The portion of the cathode resistor 24 between the point 22 and the cathode of the vacuum tube 20 is by-passed for signal frequencies by a capacitor 26. The grid of the vacuum tube 20 is biased through a resistor 28 from a battery 30. The anode of the tube 20 is provided with operating voltage from a suitable source of unidirectional potential, not shown, through the resistor 32. The anode is kept at ground potential for signal frequencies by a capacitor 34 connected between the anode of the tube 20 and ground.

Similarly, the delayed signal is shown as connected to a point 36 on a second cathode resistor 38 which is conected between ground and the cathode of a second vacuum tube 40. The portion of the resistor 38 between the tap 36 and the cathode of the tube 40 is by-passed for signal frequencies by a capacitor 42. The grid of the second tube 40 is biased from a battery source 44 through a resistor 46. The anode of the second tube 40 is provided with operating potential from a battery source 48 through an inductor 50. The delayed signal appearing at the anode of the second tube 40 can be coupled to the inner conductor of concentric line 52 (not having a semiconductive filler) and applied to a load circuit (not shown).

Another impedance matching coupling means for a delay line such as that of FIGURES 1 and 2 is shown in FIGURE 3. In FIGURE 3, the outer conductor 54 of the delay line 56 beyond the cylindrical uniform diameter central portion thereof, in both directions therefrom, is formed to have an exponential tapered portion 57. The inner conductor 58 continues without change in diameter. By choice of the tapers of the tapered portions 57 of the outer conductor 54 and of the length of the tapered portions 57, the input and the output impedance of the delay line 56 may be made to match the input and the load circuits connected thereto respectively. The central portion of the delay line 56 is filled with semiconductive material 60 which is insulated from both the inner and outer conductors of the concentric line 56 by a thin film insulator 17, and a variable voltage source 62 is connected across the ends of the semiconductive material 60.

A third embodiment of the delay line is shown in FIGURE 4. In this figure, a rectangular wave guide 64 of rectangular cross section is provided. Coupling is made to the wave guide 64 by concentric stub terminal conductors 68. An end of each of the outer conductors of the terminal conductors or stubs 68 is connected to the wave guide 64. The inner conductors of the terminals 68 extend into the wave guide 64 at right angles to the length thereof. Wave guide 64 is filled with semiconductive material 70 which is insulated from the wave guide 64 by a thin film insulator 17 and from the conductors comprising the terminal conductors 68. A variable delay controlling voltage source 72 is connected across the ends of the semiconductive material 70. The signal to be delayed is applied to one terminal 68 and the delayed signal is taken from the other terminal 68.

A further embodiment of the delay line is shown in FIGURE 5. In this figure, a ground plate 74, which may be the chassis of an instrument or device or apparatus of which the delay line is a part, has a rod of semiconductive material 76 deposited thereon and a layer of conductor 78 deposited on the semiconductive material 76. The semiconductor 76 is insulated from both of the conductors 74 and 78, which are insulated from each other, by thin film insulators 17. A pair of terminals 80 are provided for conductor 78, one at each end thereof. A delay controlling potential is applied by a variable source 82 across the ends of the semiconductive material. The signal to be delayed is applied to one terminal 80 and the delayed signal is taken from the other terminal 80.

In each of the embodiments of the delay line of FIGURES 1–4, wherein the semiconductive material is insulated from and placed in juxtaposition to a conductor to which a signal is applied, the signal applied to one terminal of the delay line arrives at the other terminal substantially unattenuated, and after a delay which is inversely proportional to the potential of the source applied across the semiconductor portion of the delay line. The delay provided may be as much as 100 microseconds. All the components of the applied signal are delayed for an equal time interval whereby the output wave is a faithful replica of the input wave.

Operation of the delay line of this invention may be explained as follows:

When the electromagnetic wave comprising the input signal travels down the delay line, an interaction of accelerated free electrons in the semiconductor portion of the delay line takes place with the radio frequency magnetic field due to the applied direct current field. As a result, a portion of D.C. energy is converted into the input radio frequency energy, so that the propagation constant of the traveling wave is considerably modified. First, the absorption of radio frequency energy by the line will be substantially decreased and the line will become lossless as far as radio frequency energy is concerned if semiconductor materials of high mobility as well as high carrier density are used. Secondly, the electromagnetic wave that travels along the delay line assumes a new phase constant that may be expressed by the formula $\beta=\omega/V_0$ wherein $\omega$ is the angular velocity and $V_0$ is the electron drift velocity. Thus the wave now travels at a velocity $V_0$ which is typically about three orders of magnitude slower than the normal velocity of the electromagnetic waves in the semiconductive material whereby the applied signal wave is delayed.

The advantages of such a delay line are:

(1) The amount of delay is electronically variable as by changing the direct current electric potential applied across the semiconductive body of material, increasing potential causing decreasing delay, (2) Because of the traveling wave mode of operation of the delay line, the band width of the delayed signal is extremely broad whereby the delay line introduces no distortion into the delayed signal, and (3) A large delay up to about 100 microseconds, may be accomplished with substantially no loss of signal energy.

Although only four embodiments of a delay line according to this invention have been shown and described, variations thereof are possible within the spirit of the present invention. Hence it will be understood that the foregoing description is to be considered as illustrative and not in a limiting sense.

What is claimed is:

1. A delay line comprising:
- a hollow wave guide,
- coupling means for said wave guide comprising a pair of concentric terminal stubs,
- the outer conductor of said stubs being connected to said wave guide,
- the inner conductors of said stubs extending into said wave guide,
- semiconductive material substantially filling a portion of said wave guide,
- said semiconductor material being insulated from said wave guide and from said stubs, and
- means to apply a delay controlling potential between points on said semiconductive material.

2. A semiconductive delay line having impedance matching terminals, said delay line comprising:
- a concentric conductor comprising an inner and an outer conductor and semiconductive material substantially filling the space between at least a portion of said inner and outer conductors,
- said semiconductive material being insulated from each of said inner and said outer conductors,
- means for applying a voltage between spaced points on said semiconductor, end portions of said outer conductor being formed to have an exponentially increasing diameter with the large ends of said end portions of said outer conductor extending away from each other to achieve said impedance matching.

References Cited

UNITED STATES PATENTS

| | | | |
|---|---|---|---|
| 3,119,074 | 1/1964 | Chang | 330—35 |
| 3,022,472 | 2/1962 | Tannenbaum | 333—18 |
| 2,760,012 | 8/1956 | Peter | 330—5 |
| 3,008,089 | 11/1961 | Unlir | 330—5 |
| 3,122,655 | 2/1964 | Murray | 307—88.5 |
| 3,173,102 | 3/1965 | Loewenstern | 330—39 |
| 3,321,738 | 5/1967 | Trott | 340—10 |

HERMAN KARL SAALBACH, Primary Examiner

C. BARAFF, Assistant Examiner

U.S. Cl. X.R.

307—262, 293, 299, 308; 330—5, 39; 333—18